US010956948B2

(12) United States Patent
Mediratta et al.

(10) Patent No.: US 10,956,948 B2
(45) Date of Patent: Mar. 23, 2021

(54) SYSTEM AND METHOD FOR HOTEL DISCOVERY AND GENERATING GENERALIZED REVIEWS

(71) Applicants: Anupam Mediratta, Bangalore (IN); Gaurang Gupta, Bangalore (IN)

(72) Inventors: Anupam Mediratta, Bangalore (IN); Gaurang Gupta, Bangalore (IN)

(73) Assignees: Anupam Madiratta, Bangalore (IN); Gaurang Gupta, Bangalore (IN)

( * ) Notice: Subject to any disclaimer, the term of this patent is extended or adjusted under 35 U.S.C. 154(b) by 821 days.

(21) Appl. No.: 15/347,770

(22) Filed: Nov. 9, 2016

(65) Prior Publication Data

US 2017/0132676 A1 May 11, 2017

(30) Foreign Application Priority Data

Nov. 9, 2015 (IN) .......................... 6058/CHE/2015

(51) Int. Cl.
| | |
|---|---|
| *G06Q 30/00* | (2012.01) |
| *G06Q 30/02* | (2012.01) |
| *G06Q 30/06* | (2012.01) |
| *G06Q 50/12* | (2012.01) |
| *G06K 9/62* | (2006.01) |

(52) U.S. Cl.
CPC ..... *G06Q 30/0282* (2013.01); *G06Q 30/0643* (2013.01); *G06K 9/6282* (2013.01); *G06Q 50/12* (2013.01)

(58) Field of Classification Search
None
See application file for complete search history.

(56) References Cited

U.S. PATENT DOCUMENTS

| | | | |
|---|---|---|---|
| 10,439,965 B1* | 10/2019 | Guarraci | G06Q 30/02 |
| 2003/0217052 A1* | 11/2003 | Rubenczyk | G06F 16/3323 |
| 2013/0291079 A1* | 10/2013 | Lowe | H04L 65/403 |
| | | | 726/7 |

(Continued)

OTHER PUBLICATIONS

Kiran Sarvabhotla et al; "Sentiment classification: a lexical similarity based approach for extracting subjectivity in documents"; Apr. 29, 2010; Springer Science+Business Media, LLC (Year: 2010).*

*Primary Examiner* — Naeem U Haq
*Assistant Examiner* — Norman Donald Sutch, Jr.
(74) *Attorney, Agent, or Firm* — Barry Choobin; Patent 360LLC

(57) ABSTRACT

The embodiment herein provides a method and system for providing an integrated information about a product or a feature and generating generalized reviews. The system and method is applicable to products or features including but not limited to hotels, food, restaurants, travel itineraries and transport. The system provides a hotel discovery platform to enable a plurality of users to discover a plurality of hotels and reviews related to the plurality of hotels. The system also provides a generalized review of each of the hotel, based on a plurality of third-party user reviews. The system provides a generalized review of each of the component of the hotel along with a plurality of related pictures. The system comprises a computing device and an application server. The application server comprises a registration module, a query receiver, a knowledge tree, an analysis module and the display module.

4 Claims, 6 Drawing Sheets

(56) References Cited

U.S. PATENT DOCUMENTS

| | | | |
|---|---|---|---|
| 2014/0074520 A1* | 3/2014 | Hicks | G06Q 10/02 |
| | | | 705/5 |
| 2014/0149376 A1* | 5/2014 | Kutaragi | G06K 9/4676 |
| | | | 707/706 |
| 2014/0164365 A1* | 6/2014 | Graham | G06Q 50/01 |
| | | | 707/723 |
| 2015/0186790 A1* | 7/2015 | Ehlen | G06F 16/24578 |
| | | | 706/52 |
| 2017/0221128 A1* | 8/2017 | Galitsky | G06F 17/2765 |

* cited by examiner

SYSTEM AND METHOD FOR HOTEL DISCOVERY AND GENERATING GENERALIZED REVIEWS

CROSS-REFERENCE TO RELATED APPLICATION

The embodiments herein claim the priority of the Indian Provisional Patent Application with Serial Number 6058/CHE/2015 filed on Nov. 9, 2015, with the title,"'A SYSTEM AND METHOD FOR HOTEL DISCOVERY AND GENERATING GENERALIZED REVIEWS", and the contents of which is included entirely as reference herein.

BACKGROUND

Technical Field

The embodiment herein is generally related to data processing and data analysis systems and methods. The embodiment herein is particularly related to data processing and data analysis of user-generated content. The embodiment herein is more particularly related to a system and method for data analysis and data processing of user generated hospitality industry reviews such as hotel reviews.

Description of the Related Art

A consumer review is a critical evaluation of a product or a service based on a personal experience, which is generally published or broadcasted in multimedia for helping other consumers to make decisions on the product, or the service offered. In addition to the critical evaluation, the reviewer may assign a rating to indicate a relative merit.

The consumer reviews of products and services are a popular source of information for other consumers in forming the purchasing decisions. The consumer reviews play a significant role, especially in hospitality services such as travel-related services like booking hotels, for selecting or rejecting the service. There are a plurality of review publishing websites such as TripAdvisor™, Oyster™, TripExpert™, etc., that publishes reviews from the users as well as from professional reviewers.

The user has to check multiple reviews sourced from a plurality of users for selecting or rejecting a hotel. However, this is not be feasible as there are hundreds of reviews for each hotel and service. Further, the user goes only through recent reviews, and as a result of this, the user loses the precise and authentic review of the hotel.

Hence, there is a need for a method and system that enable the users to search the hotels and read reviews of the hotels in an efficient way. Further, there is a need for a method and system that enables users to read the reviews of each of the component of the hotel and hotel services without any bias. Still further, there is a need for a method and system that generates generalized reviews for the hotels, components of the hotels and the hotel services.

The above-mentioned shortcomings, disadvantages and problems are addressed herein and which will be understood by reading and studying the following specification.

OBJECTS OF THE EMBODIMENTS

The primary object of the embodiment herein is to provide a system and method for providing an integrated information about a product or a feature overlapping reviews, images, and user sentiments for a query search.

Another object of the embodiment herein is to provide a system and method that enables discovery and generalised review of any products or features including but not limited to hotels, food, restaurants, travel itineraries and transport.

Another object of the embodiment herein is to provide hotel discovery and generating generalized reviews.

Another object of the embodiment herein is to provide a hotel discovery platform for searching hotels.

Yet another object of the embodiment herein is to develop a system and method for processing the user-generated reviews provided by a plurality of users.

Yet another object of the embodiment herein is to develop a system and method for analysing the reviews generated by a plurality of users.

Yet another object of the embodiment herein is to develop a system and method for integrated content summarisation and query search.

Yet another object of the embodiment herein is to develop a system and method for mapping the reviews generated by the plurality of users to a particular component of the hotel and hotel services.

Yet another object of the embodiment herein is to develop a system and method for generating an unbiased review of the hotel and the hotel services using machine leaning and artificial intelligence.

Yet another object of the embodiment herein is to develop a system and method for presenting the generalized reviews and displaying images of the components of the hotel in the form of notification cards on a computing device.

These and other objects and advantages of the embodiment herein will become readily apparent from the following detailed description taken in conjunction with the accompanying drawings.

SUMMARY

The various embodiments of the embodiment herein discloses a system and a method for providing an integrated information about a product or a feature overlapping reviews, images, and user sentiments for a query search. The system and method that enables discovery and generalised review of any products or features including but not limited to hotels, food, restaurants, travel itineraries and transport. Further, the embodiment herein provides a hotel discovery platform to enable a plurality of users to discover/search a plurality of hotels and reviews related to the plurality of hotels. The embodiment herein also provides a generalized review of each of the hotel, based on a plurality of third-party user reviews. Further, the embodiment herein provides a generalized review of each of the component of the hotel along with a plurality of related pictures.

A method for providing an integrated information about a product or a feature comprises receiving a first search query associated with a product or a feature by a query receiver. An attribute of the first search query is determined by a language modeler, wherein the attribute comprises a characteristic of the product. Further, expanded search queries associated with the determined attributes are automatically generated by a knowledge tree module. A second set of search queries or nodes based on the expanded search queries are received from the user by the query receiver. The second set of search queries comprises tree nodes and leaf nodes associated with the first search query. The knowledge tree module determines a product or a feature corresponding to the first search query and the second set of search queries. Further, the knowledge tree module maps the first search query and the second set of search queries with reviews and images relevant to the product and the feature. The mapping is performed by at least one of image recognition techniques, contextual data analysing techniques, sentiment analysis, and word vector analysis. Furthermore, sentiment analysis is performed on the mapped reviews and images to overlap images with sentiment labels. The sentiment labels comprises one of but not limited to happy, satisfied, content, value for money, neutral, and unhappy. Consequently, the integrated information related to the product or the feature is provided by an analysis engine. The integrated information comprises at least one of mapped reviews, and relevant images overlapped with sentiment labels.

According to one embodiment of the embodiment herein, the method further comprises acquiring a review submitted by said user by a registration module. The review concerns a product, an item or a feature and contains data in formats selected from a group consisting of text format, image format, multimedia format and combinations thereof. Further, the analysis module assigns weights are to words in the review. The sentiment analysis module performs a sentiment mining of said review so as to generate sentiment labels. The step of automatically generating expanded search queries associated with the first search query further comprises constructing a tree structure for the first search query with tree nodes and leaf nodes. The tree nodes and the leaf nodes are high level attributes and low level attributes associated with the first search query. The tree nodes comprises one of but not limited to value for money, style, services, room, food, beverages, amenities, and location. The leaf nodes comprises one of but not limited to boutique, classic, family_friendly, room service duration, furniture, appliances, clothing, and bathroom.

According to an embodiment of the embodiment herein, the analysed query is mapped to a plurality of relevant content. The relevant content includes, but are not limited to opinion about the hotel, opinion about the hotel services, multimedia images of the hotel and the components of the hotel. Further, the components of the hotel include, but are not limited to amenities such as pool, type of cuisine served in the hotel, room type, room amenities, service provided by the hotel. The query is mapped to the plurality of reviews present a plurality of third-party databases.

According to an embodiment of the embodiment herein, the query is analysed using a plurality of machine learning, artificial intelligence, sentiment analysis, word vector analysis, image recognition techniques. Once the data is mapped to the relevant hotels, a plurality of hotels fulfilling/satisfying the preferences set by the user is displayed to the user on his computing device.

According to an embodiment of the embodiment herein, the relevant hotels are displayed in accordance with the pre-determined rules and regulations set by the application owner. The examples of the pre-determined rules and regulations include, but are not limited to a popularity of the hotel, a business logic, a cost of the hotel, a bandwidth available for the application server, a contextual analysis.

According to an embodiment of the embodiment herein, the recommended hotel along with a generalized review of the hotel is presented to the user of the computing device. The generalized review is generated by analysing a plurality of reviews obtained from the third-party databases, generating sentences/review from the multimedia obtained from the third-party databases, sentiment analysis, word vector analysis, attribute analysis.

The image of the hotel along with a generalized review is presented to the user. Further, the generalized reviews include a plurality of metatags, to allow the user to click for obtaining further information. For example, when a hotel image along with the review, which reads, "Most people spoke awesome about it, and of the opinion that the rooms were refreshing" is displayed, the user is allowed to select the metatag room. When the user selects the metatag room, the application displays the images of the rooms of that hotel, along with the generalized review about the rooms. Furthermore, the generalized review about the rooms include metatags that provide information about the components of the room, such as the dressing table, furniture, bed.

According to an embodiment of the embodiment herein, the knowledge graph is specific to the hotel amenities where, all hotel amenities are hierarchically arranged. For example, the hierarchy for the amenity room is arranged as room>room_furniture>room_linen>room_bathroom. Further, the hierarchy for the amenity room_bathroom is arranged as room_bathtoom_shower>room_bathroom_bathtub. According to an embodiment of the embodiment herein, when the user selects one of the amenities of the hotel, the application server defines the spatial location of the amenity.

According to an embodiment of the embodiment herein, the application server has the ability to map the hotel experience related content to a particular node in the knowledge graph. For example, when the user generated content for a particular hotel is "The water in the shower was not hot at all", the application server maps the user generated content as Room>bathroom>shower. When the user searches for the bathroom review or the shower review, the mapped content about the shower along with the multimedia content is displayed to the user.

According to an embodiment of the embodiment herein, image recognition techniques are applied on the images to retrieve the meaning of contents of the image, and then map to the knowledge graph. The sum of the knowledge graph, and the image recognition techniques are used for structuring the unstructured data.

According to an embodiment of the embodiment herein, when the unstructured data is converted to a structured data format, the content is easier for the consumption of the end-user. For example, when the end-user is seeing the review about the bathroom of a particular hotel (from a site such as Instagram™), the review of the related bathroom (from a site such as TripAdvisor™) content is presented to the user. According to an embodiment of the embodiment herein, the related review is directly sourced from a third-party review such as TripAdvisor™. According to an embodiment of the embodiment herein, the related review is a generalized review that is generated by the application server.

According to one embodiment of the embodiment herein, the method enables a user to search for hotels which have good swimming pool, food and location not too far from the sea beach. Further, the method provides spam review detection by filtering reviews which fall into the category of bring either extremely positive or extremely negative, automatically. Spam reviews fall into this category so we have an easier way to filter them. The method provides search engine over User Generated Content by enabling a user to select an option of displaying all the negative reviews about the Wi-Fi of the hotel (For example, Wi-Fi is given as a query).

According to an embodiment of the embodiment herein, the images of the hotel, hotel components, and the generalized review are generated dynamically by analysing and mapping a plurality of reviews dynamically. According to an embodiment of the embodiment herein, the images of the hotel, hotel components, and the generalized review are pre-computed and stored in the database of the application server. The user navigates through a plurality of hotels and the generalized reviews of the hotels and hotel components and selects one of the recommendations. The user can optionally share the displayed hotels and the generalized reviews with friends and family using a "share" option provided in the application.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
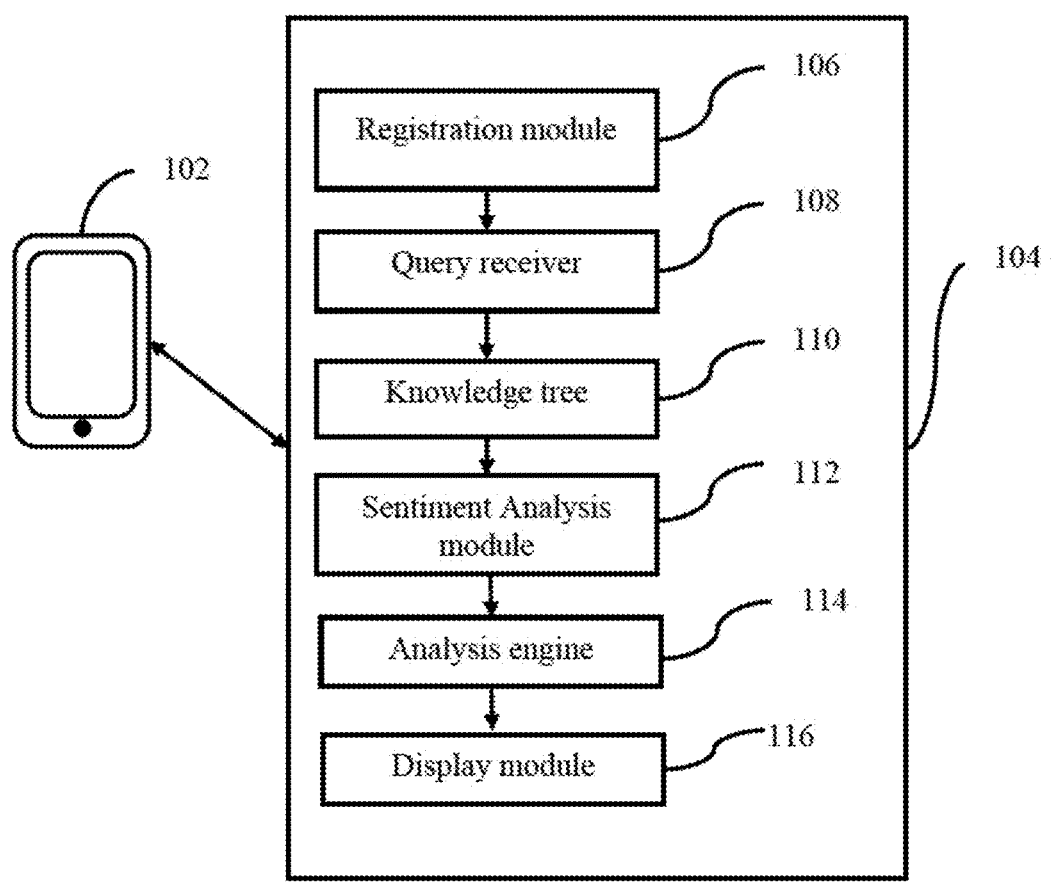
FIG. 1 illustrates a block diagram of a system for a hotel discovery platform, according to an embodiment of the embodiment herein.

Although the specific features of the embodiment herein are shown in some drawings and not in others. This is done for convenience only as each feature may be combined with any or all of the other features in accordance with the embodiment herein.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the embodiment herein discloses a system and a method for discloses a system and a method for providing an integrated information about a product or a feature overlapping reviews, images, and user sentiments for a query search. The system and method that enables discovery and generalised review of any products or features including but not limited to hotels, food, restaurants, travel itineraries and transport. Further, the embodiment herein provides a hotel discovery platform to enable a plurality of users to discover/search a plurality of hotels and reviews related to the plurality of hotels. The embodiment herein also provides a generalized review of each of the hotel, based on a plurality of third-party user reviews. Further, the embodiment herein provides a generalized review of each of the component of the hotel along with a plurality of related pictures.

A method for providing an integrated information about a product or a feature comprises receiving a first search query associated with a product or a feature by a query receiver. An attribute of the first search query is determined by a language modeler, wherein the attribute comprises a characteristic of the product. Further, expanded search queries associated with the determined attributes are automatically generated by a knowledge tree module. A second set of search queries or nodes based on the expanded search queries are received from the user by the query receiver. The second set of search queries comprises tree nodes and leaf nodes associated with the first search query. The knowledge tree module determines a product or a feature corresponding to the first search query and the second set of search queries. Further, the knowledge tree module maps the first search query and the second set of search queries with reviews and images relevant to the product and the feature. The mapping is performed by at least one of image recognition techniques, contextual data analysing techniques, sentiment analysis, and word vector analysis. Furthermore, sentiment analysis is performed on the mapped reviews and images to overlap images with sentiment labels. The sentiment labels comprises one of but not limited to happy, satisfied, content, value for money, neutral, and unhappy. Consequently, the integrated information related to the product or the feature is provided by an analysis engine. The integrated information comprises at least one of mapped reviews, and relevant images overlapped with sentiment labels.

According to one embodiment of the embodiment herein, the method further comprises acquiring a review submitted by said user by a registration module. The review concerns a product, an item or a feature and contains data in formats selected from a group consisting of text format, image format, multimedia format and combinations thereof. Further, the analysis module assigns weights are to words in the review. The sentiment analysis module performs a sentiment mining of said review so as to generate sentiment labels. The step of automatically generating expanded search queries associated with the first search query further comprises constructing a tree structure for the first search query with tree nodes and leaf nodes. The tree nodes and the leaf nodes are high level attributes and low level attributes associated with the first search query. The tree nodes comprises one of but not limited to value_for_money, style, services, room, food, beverages, amenities, and location. The leaf nodes comprises one of but not limited to boutique, classic, family_friendly, room service duration, furniture, appliances, clothing, and bathroom.

Once the query is received, the query is processed and analysed. The query, which is in the form of natural language, is processed and analysed using natural language techniques to understand the context in which the user has provided the query.

According to an embodiment of the embodiment herein, the analysed query is mapped to a plurality of relevant content. The relevant content includes, but are not limited to opinion about the hotel, opinion about the hotel services, multimedia images of the hotel and the components of the hotel. Further, the components of the hotel include, but are not limited to amenities such as pool, type of cuisine served in the hotel, room type, room amenities, service provided by the hotel. The query is mapped to the plurality of reviews present a plurality of third-party databases.

According to an embodiment of the embodiment herein, the query is analysed using a plurality of machine learning, artificial intelligence, sentiment analysis, word vector analysis, image recognition techniques. Once the data is mapped to the relevant hotels, a plurality of hotels fulfilling/satisfying the preferences set by the user is displayed to the user on his computing device.

According to an embodiment of the embodiment herein, the relevant hotels are displayed in accordance with the pre-determined rules and regulations set by the application owner. The examples of the pre-determined rules and regulations include, but are not limited to a popularity of the hotel, a business logic, a cost of the hotel, a bandwidth available for the application server, a contextual analysis.

According to an embodiment of the embodiment herein, the recommended hotel along with a generalized review of the hotel is presented to the user of the computing device. The generalized review is generated by analysing a plurality of reviews obtained from the third-party databases, generating sentences/review from the multimedia obtained from the third-party databases, sentiment analysis, word vector analysis, attribute analysis.

The image of the hotel along with a generalized review is presented to the user. Further, the generalized reviews include a plurality of metatags, to allow the user to click for obtaining further information. For example, when a hotel image along with the review, which reads, "Most people spoke awesome about it, and of the opinion that the rooms were refreshing" is displayed, the user is allowed to select the metatag room. When the user selects the metatag room, the application displays the images of the rooms of that hotel, along with the generalized review about the rooms. Furthermore, the generalized review about the rooms include metatags that provide information about the components of the room, for example, dressing table, furniture, bed.

According to an embodiment of the embodiment herein, the images of the hotel, hotel components, and the generalized review are generated dynamically by analysing and mapping a plurality of reviews dynamically. According to an embodiment of the embodiment herein, the images of the hotel, hotel components, and the generalized review are pre-computed and stored in the database of the application server. The user navigates through a plurality of hotels and the generalized reviews of the hotels and hotel components and selects one of the recommendations. The user can optionally share the displayed hotels and the generalized reviews with friends and family using a "share" option provided in the application.

The various embodiments of the embodiment herein discloses a system and a method for hotel discovery and generating generalized reviews. The embodiment herein provides a hotel discovery platform where a plurality of users discover a plurality of hotels and reviews related to the plurality of hotels. The embodiment herein also provides a generalized review of each of the hotel, which is based on a plurality of third-party user reviews. Further, the embodiment herein provides a generalized review of each of the component of the hotel along with a plurality of related pictures.

According to an embodiment of the embodiment herein, the knowledge graph is specific to the hotel amenities where, all hotel amenities are hierarchically arranged. For example, the hierarchy for the amenity room is arranged as room>room_furniture>room_linen>room_bathroom. Further, the hierarchy for the amenity room_bathroom is arranged as room_bathtoom_shower>room_bathroom_bathtub. According to an embodiment of the embodiment herein, when the user selects one of the amenities of the hotel, the application server defines the spatial location of the amenity.

According to an embodiment of the embodiment herein, the application server has the ability to map the hotel experience related content to a particular node in the knowledge graph. For example, when the user generated content for a particular hotel is "The water in the shower was not hot at all", the application server maps the user generated content as Room>bathroom>shower. When the user searches for the bathroom review or the shower review, the mapped content about the shower along with the multimedia content is displayed to the user.

According to an embodiment of the embodiment herein, image recognition techniques are applied on the images to retrieve the meaning of contents of the image, and then map to the knowledge graph. The sum of the knowledge graph, and the image recognition techniques are used for structuring the unstructured data.

According to an embodiment of the embodiment herein, when the unstructured data is converted to a structured data format, the content is easier for the consumption of the end-user. For example, when the end-user is seeing the review about the bathroom of a particular hotel (from a site such as Instagram™), the review of the related bathroom (from a site such as TripAdvisor™) content is presented to the user. According to an embodiment of the embodiment herein, the related review is directly sourced from a third-party review such as TripAdvisor™. According to an embodiment of the embodiment herein, the related review is a generalized review that is generated by the application server.

FIG. 1 illustrates a system diagram of a hotel discovery platform, according to an embodiment of the embodiment herein. The system diagram comprises the computing device 102 and the application server 104. A user of the computing device 102 is connected to the application server 104 to discover the hotels and read the generalized reviews. The examples of the computing device 102 include, but are not limited to a mobile phone, a smartphone, a wearable device, a laptop, a desktop. The user of the computing device 102 communicates with the application server 104 through a communication network (not shown in figure). The examples of the communication network include, but are not limited to the internet, an intranet, a radio frequency network, a telephone network, a satellite network.

According to an embodiment of the embodiment herein, the user of the computing device 102 discovers the hotels and the related reviews by downloading a mobile application provided by the application server 104. According to an embodiment of the embodiment herein, the user of the computing device 102 discovers the hotels and the related reviews by accessing the application server 104 through a browser application enabled using the communication network. According to an embodiment of the embodiment herein, the user of the computing device 102 discovers the hotels and related reviews using a software package.

The application server 104 includes the registration module 106, the query receiver 108, the knowledge tree 110, and the display module 112. The registration module 106 is configured to register the user to the hotel discovery platform. The user has to provide a plurality of details while registering to the hotel discovery platform. The information provided by the user is stored in the registration module 106. The examples of the information received from the user by the registration module 106 include, but are not limited to user name, user email id, user location, user phone number. Further, the registration module 106 acquires a review submitted by the user. The review concerns an item or a product and contains data in formats selected from a group consisting of text format, image format, and multimedia format. The registration module generates a collection of topics associated with the user, wherein the collection of topics contains at least one topic. Thus, the user profile is stored with reference to the collection of topics.

The query receiver 108 is configured to receive a plurality of queries from the user. The query receiver 108 receives the query from the user, which is in the form of natural language. The query receiver 108 acts as a filter to enable the hotel discovery to the user. The user generates the query either in an objective type or as a subjective type. The example of the query received by the query receiver 108 include, but are not limited to Hotels in Delhi, Budget Hotels in Bangalore, Business Hotels in Noida, Resorts in Goa with private beach. Further, the query receiver receives the preferences set by the user. The query receiver 108 receives the query as generated by the user and transmits to the knowledge tree 110.

The knowledge tree 110 is configured to receive the query from the query receiver 108, process and analyses the queries. An attribute of the first search query is determined by a language modeler, wherein the attribute comprises a characteristic of the product. The knowledge tree 110 is configured to automatically generate expanded search queries associated with the determined attributes. A second set of search queries or nodes based on the expanded search queries are received from the user by the query receiver 108. The second set of search queries comprises tree nodes and leaf nodes associated with the first search query. The knowledge tree 110 is further configured to map the first search query and the second set of search queries to a relevant content present in a plurality of databases, displays the most appropriate results to the users. Further, the knowledge tree 110 is configured to generate a generalized review of the each of the result retrieved using machine learning and artificial intelligence techniques.

Furthermore, sentiment analysis module 112 performs sentiment analysis on the mapped reviews and images to overlap images with sentiment labels. The sentiment labels comprises one of but not limited to happy, satisfied, content, value for money, neutral, and unhappy. Consequently, the integrated information related to the product or the feature is provided by an analysis engine. The integrated information comprises at least one of mapped reviews, and relevant images overlapped with sentiment labels.

The analysis engine 114 uses at least one of image recognition techniques, contextual data analysing techniques, sentiment analysis, and word vector analysis to map the query to the third-party user generated content. Further, the analysis engine 114 displays the results of the appropriate hotels and generate a generalized review.

According to one embodiment of the embodiment herein, the review concerns a product, an item or a feature and contains data in formats selected from a group consisting of text format, image format, multimedia format and combinations thereof. Further, the analysis module assigns weights are to words in the review. The sentiment analysis module performs a sentiment mining of said review so as to generate sentiment labels. The step of automatically generating expanded search queries associated with the first search query further comprises constructing a tree structure for the first search query with tree nodes and leaf nodes. The tree nodes and the leaf nodes are high level attributes and low level attributes associated with the first search query. The tree nodes comprises one of but not limited to value_for_money, style, services, room, food, beverages, amenities, and location. The leaf nodes comprises one of but not limited to boutique, classic, family_friendly, room service duration, furniture, appliances, clothing, and bathroom.

Once the knowledge tree 110 maps the user query to the relevant hotels, the display module 112 displays the relevant hotels and generalized review in a specific pre-determined format. According to an embodiment of the embodiment herein, the specific format is determined by the owner of the application server 104. According to an embodiment of the embodiment herein, the specific format is determined by the user of the computing device 102. The example of the display include, but are not limited to display of the relevant hotels and generalized reviews in the form of a notification card, display of the relevant hotels and generalized review in the form of infographics. Thus, the system provides integrated content summarisation and query search.

"Attribute" is a characteristic of the product and that characteristic can be an item or an abstract characteristic. The Attribute can be a swimming pool or a characteristic such as "family-friendly." The Attribute related to travel themes, amenities of travel products and suitability for categories of travellers include "view", "good for children", "good for pets," "safe for single female travellers," "safe for teenagers," "location", and "ambiance". If a document indicates that a hotel has a babysitting service, the feature "family friendly" can then be implicit from the feature babysitting service.

According to one embodiment of the embodiment herein, "Sentiment" is an expression of a subjective judgment or determination. "Sentiment" can be embodied by adjectives, verb expressions, negations or indirect indications. Sentiment is also assigned a value, −1, −0.5, 0, 0.5, or 1. For example, the adjectives "awful," "so-so," "good," and "great" are, respectively, −1, −0.5, 0.5, and 1. The verb expressions "I dislike" and "I like" are, respectively, −0.5 and 0.5. Negations, including, "not", "would not", "no", and "instead" usually refer to a negative sentiment and have a value of −1. Examples of indirect indications of sentiment and their values include "would return," (+0.5); "worth doing," (+1); "never wanted to leave the room," (+1 for the feature "Romantic travel"); "never come again" (−1); and "safe to travel on my own," (+1). In some instances, sentiments overlap with features. For example, the phrase "clean room" indicates a positive sentiment in the word, "clean." Additionally "cleanliness" is a feature of a product, such as a hotel. A sentiment value of 0 indicates that there is no sentiment indicated in the phrase extracted.

Figure 2:
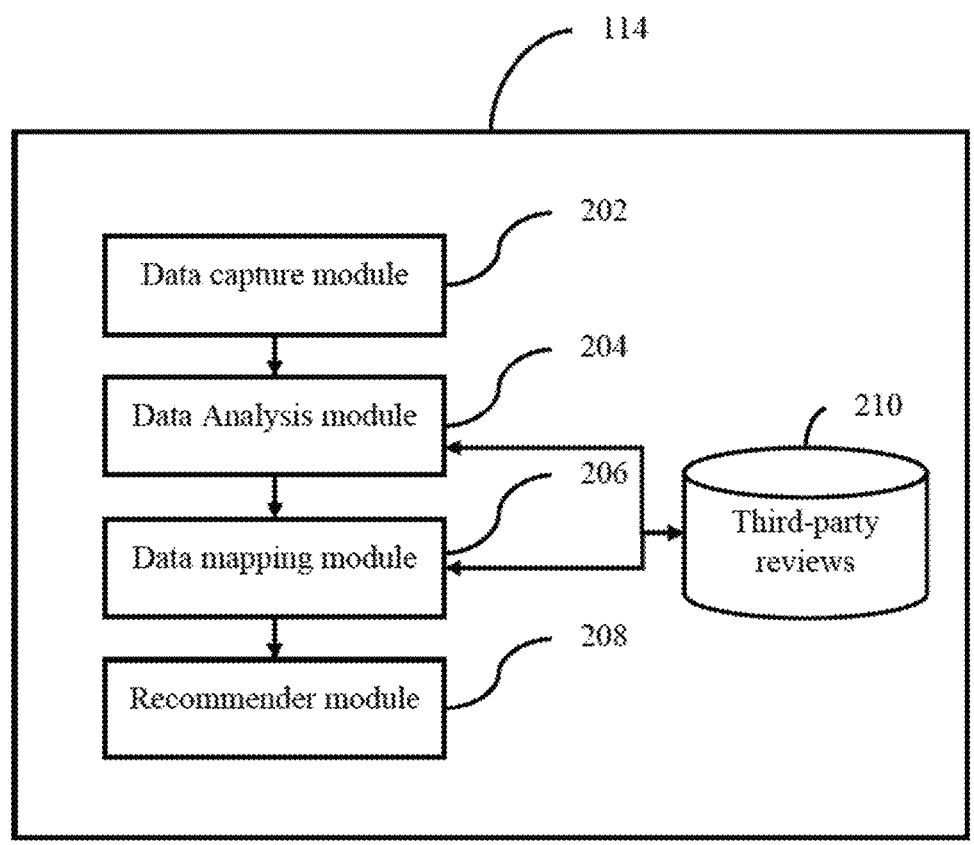
FIG. 2 illustrates a block diagram of a knowledge tree in the system and method for searching and analysing hotel reviews, according to an embodiment of the embodiment herein.

FIG. 2 illustrates a block diagram of a knowledge tree, according to an embodiment of the embodiment herein. The knowledge tree 110 is used for understanding the queries provided by the user and map the queries to the relevant hotels and display the same to the user using a knowledge graph. Further, the knowledge tree 110 is configured to create generalized reviews of each of the relevant hotels to enable easy understanding of the hotels and the hotel services.

The analysis module 114 includes the data capture module 202, the data analysing module 204, the data mapping module 206, the third-party database 208, and the recommender module 210.

The data capture module 202 is configured to capture the data provided by the query receiver. The data capture module 202 is configured to capture the data that is in the form of natural language. The examples of the data captured by the data capture module 202 includes, but are not limited to the location in which the hotel has to be searched, type of hotel and the hotel services, amenities provided by the hotel, cost of the hotel. Further, the data capture module 202 is configured to capture the details of the user, type of the computing device, nature of the computing device, location of the user, browsing history of the user. The data capture module 202 is configured to process the query received in an appropriate manner to enable the other modules to analyse the query effectively and efficiently.

The data analysing module 204 process the query as processed by the data capture module 202. The data analysing module 204 analyses the data from the data third-party database 210 and the data capture module 202. The examples of the analysis of the data by the data analysis module 204 include, but are not limited to type of the user, nature of the user, relevant results to the user. Further, the analysing module 204 is also configured to communicate with the third-party review database 210 to analyse a plurality of user-generated reviews. The user-generated reviews are analysed based on a plurality of parameters such as emotion of the user, type of the review.

The third-party review database 210 stores a plurality of user-generated reviews. According to an embodiment of the embodiment herein, the user-generated reviews are in the form of unstructured data. The third-party review database 210 stores the reviews generated in the form of text, image, voice, multimedia. The third-party review database 210 stores the reviews from a plurality of review websites such as TripAdvisor™, Oyster™, Google Hotels™, and as well as the reviews from individuals published across a plurality of websites.

The data-mapping module 206 is configured to map the analysed data related to the plurality of hotels. The data-mapping module 206 is configured to map the analysed data using a plurality of pre-determined techniques. The examples of the techniques used for mapping the analysed data to the plurality of hotels include, but are not limited to generating a knowledge graph, machine learning techniques, artificial intelligence techniques, a plurality of rules and regulations set by the owner of the application server.

According to an embodiment of the embodiment herein, the data-mapping module 206 extracts the data from the third party review databases and individual reviewers. Further, the data-mapping module 206 crawls the entire websites to obtain and map the relevant hotels and the information related to the relevant hotels. According to an embodiment of the embodiment herein, the data-mapping module 206 uses image recognition techniques to annotate an image. Further, the data-mapping module 206 creates generalized reviews using sentiment analysis, knowledge graph, pre-determined attributes, word vector analysis, artificial intelligence, machine learning. According to an embodiment of the embodiment herein, the template for the generalized review is pre-determined by the owner of the application server. According to an embodiment of the embodiment herein, the template for the generalized review is pre-determined by the user of the application. According to an embodiment of the embodiment herein, the generalized review for each of the hotel and hotel services are pre-computed and stored in a database of the knowledge tree 110. According to an embodiment of the embodiment herein, the generalized reviews for each hotel and hotel service are computed dynamically.

The recommendation module 208 suggests a plurality of hotels, hotel related services, and the generalized reviews related to the hotels. The recommendation module 208 suggests the hotels, hotel services, and the generalized reviews based on the pre-determined rules and regulations set by the owner of the application.

According to an embodiment of the embodiment herein, the knowledge graph is specific to the hotel amenities where, all hotel amenities are hierarchically arranged. For example, the hierarchy for the amenity room is arranged as room>room_furniture>room_linen>room_bathroom. Further, the hierarchy for the amenity room_bathroom is arranged as room_bathtoom_shower>room_bathroom_bathtub. According to an embodiment of the embodiment herein, when the user selects one of the amenities of the hotel, the application server 110 defines the spatial location of the amenity.

According to an embodiment of the embodiment herein, the data-mapping module 206 has the ability to map the hotel experience related content to a particular node in the knowledge graph. For example, when the user generated content for a particular hotel is "The water in the shower was not hot at all", the application server maps the user generated content as Room>bathroom>shower. When the user searches for the bathroom review or the shower review, the mapped content about the shower along with the multimedia content is displayed to the user.

According to an embodiment of the embodiment herein, image recognition techniques are applied on the images to retrieve the meaning of contents of the image, and then map to the knowledge graph. The sum of the knowledge graph, and the image recognition techniques are used for structuring the unstructured data.

According to an embodiment of the embodiment herein, when the unstructured data is converted to a structured data format, the content is easier for the consumption of the end-user. For example, when the end-user is seeing the review about the bathroom of a particular hotel (from a site such as Instagram™), the review of the related bathroom (from a site such as TripAdvisor™) content is presented to the user. According to an embodiment of the embodiment herein, the related review is directly sourced from a third-party review such as TripAdvisor™. According to an embodiment of the embodiment herein, the related review is a generalized review that is generated by the application server.

According to an embodiment of the embodiment herein, the system and method that enables discovery and generalised review of any products or features including but not limited to hotels, food, restaurants, travel itineraries and transport. In an example, the system provides discovery and integrated review summary of a food along with the pictures and sentiments related to the food.

Figure 3:
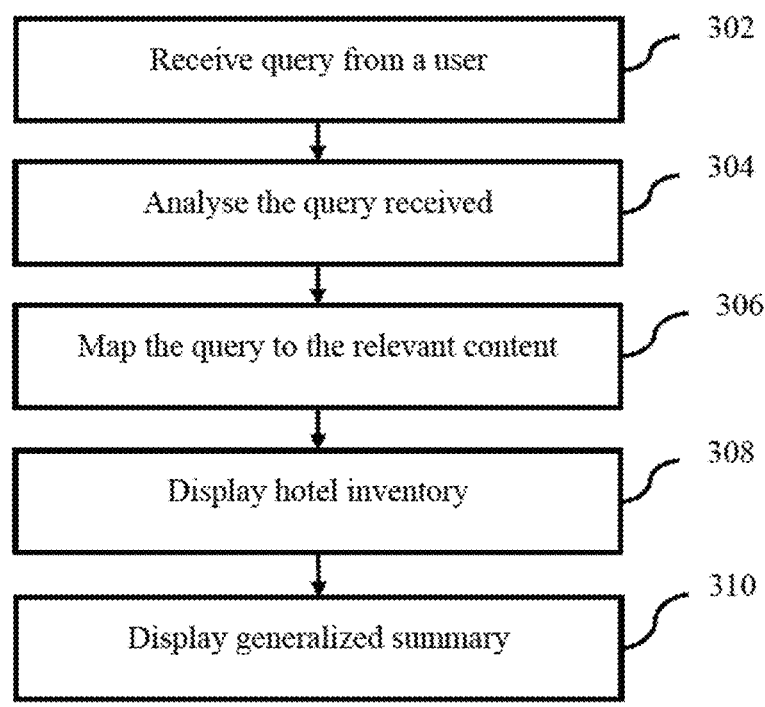
FIG. 3 illustrates a flowchart explaining the method for discovering a plurality of hotels and generating generalized reviews, according to an embodiment of the embodiment herein.

FIG. 3 illustrates a flowchart explaining the method for discovering a product and generating generalized reviews, according to an embodiment of the embodiment herein. In accordance with an embodiment of the invention, the application server receives a query related to a product or a feature from a user through are computing device (Step 302). The query is received by the query receiver in the form of natural language. The received query further includes the preferences set by the user. In an example, the preferences set by the user include, but are not limited to the type of the hotel, location settings, cuisine settings, and budget settings.

Once the query is received, the query is processed and analysed (Step 304). The query, which is in the form of natural language, is processed and analysed using natural language techniques to understand the context in which the user has provided the query.

The analysed query is mapped to a plurality of relevant content (Step 306). In an example, the relevant content includes, but are not limited to opinion about the hotel, opinion about the hotel services, multimedia images of the hotel and the components of the hotel. According to an embodiment of the embodiment herein, the components of the hotel include, but are not limited to amenities such as pool, type of cuisine served in the hotel, room type, room amenities, service provided by the hotel. The query is mapped to the plurality of reviews present in the third-party databases. According to an embodiment of the embodiment herein, the query is analysed using a plurality of machine learning, artificial intelligence, sentiment analysis, word vector analysis, image recognition techniques.

Once the data is mapped to the relevant hotels, a plurality of hotels fulfilling/satisfying the preferences set by the user is displayed to the user on his computing device (Step 308) According to an embodiment of the embodiment herein, the relevant hotels are displayed in accordance with the pre-determined rules and regulation set by the application owner. The examples of the pre-determined rules and regulations include, but are not limited to popularity of the hotel, business logic, cost of the hotel, bandwidth available for the application server, contextual analysis.

The recommended hotel along with a generalized review, and images related to the hotel is displayed to the user on the computing device (Step 310). According to an embodiment of the embodiment herein, the generalized review is created by analysing a plurality of reviews obtained from the third-party databases, generating sentences/review from the multimedia obtained from the third-party databases, sentiment analysis, word vector analysis, attribute analysis.

The generalized reviews include a plurality of metatags, to allow the user to obtain further information. For example, when a hotel image along with the review, which reads, "Most people spoke awesome about it, and of the opinion that the rooms were refreshing" is displayed, the user is allowed to select the metatag room. When the user selects the metatag "rooms", the application displays the images of the rooms of that hotel, along with the generalized review about the rooms. Furthermore, the generalized review about the rooms include metatags that provide information about the components of the room, such as the dressing table, furniture, bed.

According to an embodiment of the embodiment herein, the application server 110 enables the user to view the reviews, images, and other media about a particular hotel amenity, along with the main review of the hotel. For example, when the user is viewing the reviews and the related multimedia of the swimming pool of a hotel, the reviews and the related media of the hotel is also displayed on the computing device of the user.

According to an embodiment of the embodiment herein, the images of the hotel, hotel components, and the generalized review are generated dynamically by analysing and spatially locating and mapping a plurality of reviews. According to an embodiment of the embodiment herein, the images of the hotel, hotel components, and the generalized review are pre-computed and stored in the database of the application server. The user navigates through a plurality of hotels and the generalized reviews of the hotels and hotel components and selects one of the recommendations. The user optionally shares the displayed hotels and the generalized reviews with friends and family using a "share" option provided in the application.

According to one embodiment of the embodiment herein, the method enables a user to search for hotels which have good swimming pool, food and location not too far from the sea beach. Further, the method provides spam review detection by filtering reviews which fall into the category of bring either extremely positive or extremely negative, automatically. Spam reviews fall into this category so we have an easier way to filter them. The method provides search engine over User Generated Content by enabling a user to select an option of displaying all the negative reviews about the Wi-Fi of the hotel (For example, Wi-Fi is given as a query).

Figure 4:
FIG. 4 illustrates a screenshot illustrating a query initiated by a user, according to an embodiment of the embodiment herein.

FIG. 4 illustrates a screenshot illustrating a query initiated by a user, according to an embodiment of the embodiment herein. According to an embodiment of the embodiment herein, the query initiated by the user of the computing device 102 is in the form of natural language. According to an embodiment of the embodiment herein, the query initiated by the user of the computing device 102 is in the form of pre-determined format.

Figure 5A:
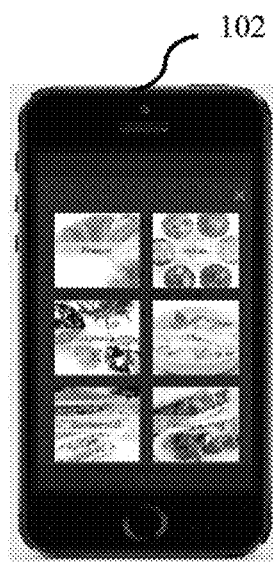
FIG. 5A-FIG. 5C illustrates a screenshot illustrating preferences selected by the user, according to an embodiment of the embodiment herein.
Figure 5B:
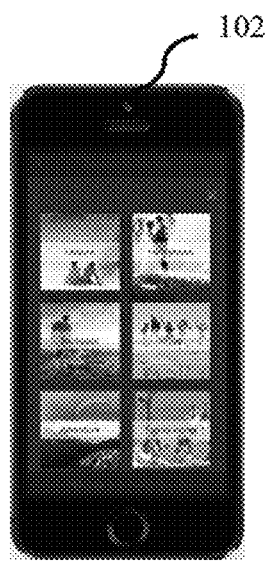
Figure 5C:
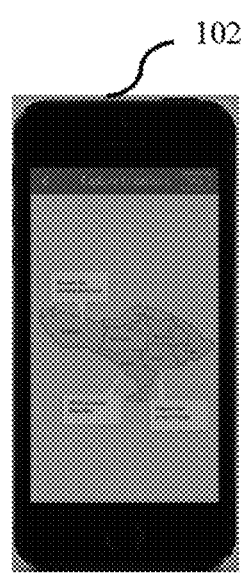

FIG. 5A-FIG. 5C illustrate a screenshot illustrating preferences selected by the user, according to an embodiment of the embodiment herein. FIG. 5A illustrates the food preference selected by the user of the computing device 102 for discovering hotels. For example, when the user selects the food preference as Indian cuisine, the hotels serving Indian cuisine are displayed along with the multimedia images and the generalized review of the hotels.

FIG. 5B illustrates the travel preference selected by the user of the computing device 102 for discovering hotels. For example, when the user selects the travel preference as honeymoon, the hotels having a plurality of honeymoon packages and suits are displayed along with the multimedia images and the generalized review of the hotels.

FIG. 5C illustrates the location preference selected by the user of the computing device 102 for discovering hotels. For example, when the user selects the location preference as beaches, the hotels having private beaches and beach views are displayed along with the multimedia images and the generalized review of the hotels. According to an embodiment of the embodiment herein, the user has an option to select a plurality of preferences to receive a relevant recommendation.

Figure 6A:
FIG. 6A-FIG. 6C illustrates a screenshot illustrating recommended hotels, hotel related services along with a generalized review, according to an embodiment of the embodiment herein.
Figure 6B:
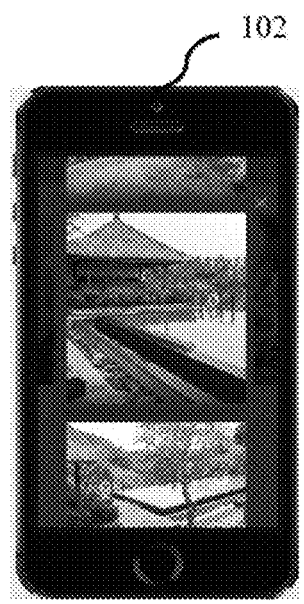
Figure 6C:

FIG. 6A-FIG. 6C illustrate a screenshot indicating recommended hotels, hotel related services along with a generalized reviews, according to an embodiment of the embodiment herein. FIG. 6A illustrates the place or the hotel recommendation and the generalized review related to the hotel, which is displayed in the form of cards in the computing device 102.

FIG. 6B illustrates the multimedia images of the metatags (in this example, pool images) when the user selects the pool metatag of the generalized reviews.

FIG. 6C illustrates the multimedia images of the selected metatag (in this example, room) when the user of the computing device selects the room or the amenities metatag of the generalized reviews. Further, FIG. 6C illustrates the generalized review about the room that is generated using a plurality of techniques such as artificial intelligence, machine learning, sentiment analysis, word vector analysis, formation of sentences by analysing the images.

Once the user explores all the possible recommendations, the user exists the application. The user can also explore other possible recommendations by changing the queries.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Advantageously, the various embodiments herein provides a system and method for hotel discovery and generating generalized reviews. The embodiment herein provides an efficient hotel discovery platform. The embodiment herein enables the user to process and analyse generated reviews in the form of unstructured data, created by a plurality of users. The embodiment herein maps the reviews generated by the users to a particular component of the hotel and hotel services. The embodiment herein generates an unbiased review of the hotel and the hotel services using machine leaning and artificial intelligence. The embodiment herein provides the generalized reviews and display images of the components of the hotel in the form of notification cards on a computing device. The embodiment herein enables the user to see the reviews, images, and other media about a particular hotel amenity, along with the reviews of the hotel.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer implemented method comprising instructions stored on a non-transitory computer readable storage medium and executed on a hardware processor provided in a portable computing device provided with a memory for providing an integrated information about a product or a feature through an algorithm or software application, the method comprising:

receiving a first search query associated with a product or a feature by a query receiver through a software application or algorithm;

determining an attribute of the first search query by a language modeller through a software application or algorithm, wherein the attribute comprises a characteristic of the product;

automatically generating expanded search queries associated with the determined attribute of the first search query by a knowledge tree module through a software application or algorithm;

receiving a second set of search queries or nodes related to the expanded search queries from a user by the query receiver through a software application or algorithm, wherein the second set of search queries comprises tree nodes and leaf nodes associated with the first search query;

determining a product or a feature corresponding to the first search query and the second set of search queries by the knowledge tree module through a software application or algorithm, and wherein the step of automatically generating expanded search queries associated with the determined attribute of the first search query further comprises constructing a knowledge tree structures for the first search query with tree nodes and leaf nodes through a software application or algorithm, and wherein the tree nodes and the leaf nodes are high level attributes and low level attributes associated with the first search query, and wherein the tree nodes comprise at least one of value for money, style, services, room, food, beverages, amenities, and location, and wherein the leaf nodes comprise at least one of boutique, classic, family friendly, room service duration, furniture, appliances, clothing, and bathroom;

mapping the first search query and the second set of search queries with reviews and images relevant to the product and the feature by the knowledge tree module, wherein the mapping is performed by at least one of image recognition techniques, contextual data analyzing techniques, sentimental analysis, word vector analysis and natural language processing;

performing sentiment analysis on the mapped reviews and images to overlap images with sentiment labels through a software application or algorithm, wherein the sentiment labels comprises one or more of happy, satisfied, content, value for money, neutral, and unhappy;

performing a sentiment mining of said review by a sentiment analysis module through a software application or algorithm so as to generate sentiment labels, and wherein sentiment is embodied by adjectives, verb expressions, negations or indirect indications, and wherein sentiment is also assigned with a value that includes −1, −0.5, 0, +0.5, and +1;

providing the integrated information related to the product or the feature by an analysis module through a software application or algorithm, wherein the integrated information comprises the mapped reviews, and relevant images overlapped with the sentiment labels, and wherein integrated information about a product or a feature overlapping reviews, images and user sentiments for a query search are presented and displayed in a form of notification cards and infographics, and wherein the reviews include a plurality of metatags to allow the user to click for obtaining further information, and wherein the plurality of metatags are multimedia messages;

acquiring a review submitted by said user by a registration module through a software application or algorithm, wherein said review concerns a product, an item or a feature and contains data in formats selected from a group consisting of text format, image format, multimedia format and combinations thereof, and wherein the registration module is configured to generate a collection of topics associated with the user, and wherein the collection of topics comprises at least one topic;

assigning weights to words in the review by the analysis module through a software application or algorithm;

wherein the image recognition techniques are applied on the images to retrieve a meaning of contents of the image, and then map to a knowledge graph, and wherein a sum of the knowledge graph and the image recognition techniques are used for structuring an unstructured data for consumption of the end user, and wherein the knowledge graph is created specific to the hotel amenities and wherein all hotel amenities are hierarchically arranged in the knowledge graph, and wherein the knowledge tree is configured to create generalized reviews of each of the relevant hotels to enable easy understanding of the hotels and the hotel services, and wherein sentences/review are generated from multimedia obtained from third-party databases, sentiment analysis, word vector analysis, and attribute analysis, and wherein a data mapping module is configured to annotate an image using image recognition techniques.

2. The method as claimed in claim 1, wherein the product or items comprises at least one of hotels, food, restaurants, items, travels, and airlines.

3. A computing system for providing an integrated information about a product or a feature through a software application or algorithm, the system comprising:
 a database configured for storing details of a user and reviews associated with a product, an item or a feature;
 a computing device communicably coupled to an application server;
 wherein the application server further comprises:
 a query receiver configured to receive a first search query associated with a product or a feature from the computing device through a software application or algorithm;
 a language modeler configured to determined an attribute of the query, wherein the attribute comprises a characteristic of the product through a software application or algorithm;
 a knowledge tree module configured to automatically generate expanded search queries associated with the determined attribute through a software application or algorithm, and wherein the knowledge tree module is further configured to determine a product or a feature corresponding to the first search query and a second set of search queries by the knowledge tree module, and wherein the second set of search queries comprises tree nodes and leaf nodes associated with the first search query, and wherein the knowledge tree module is further configured to map the first search query and the second set of search queries with reviews and images relevant to the product and the feature through a software application or algorithm, and wherein knowledge tree structures comprises tree nodes and leas nodes, and wherein the tree nodes and the leaf nodes are high level attributes and low level attributes associated with the first search query, and wherein the tree nodes comprise one or more of value for money, style, services, room, food beverages, amenities, and location, and wherein the leaf nodes comprise at least one of boutique, classic, family friendly, room service duration, furniture, appliances, clothing, and bathroom;
 a sentiment analysis module configured to perform sentiment analysis on the mapped reviews and images to overlap images with sentiment labels through a software application or algorithm, wherein the sentiment labels comprises one or more of happy, satisfied, content, value for money, neutral, and unhappy, and wherein sentiment is embodied by adjectives, verb expressions, negations or indirect indications, and wherein sentiment is also assigned with a value that includes −1, −0.5, 0, +0.5, and +1;
 an analysis module is configured to provide the integrated information related to the product or the feature through a software application or algorithm, wherein the integrated information comprises the mapped reviews, and relevant images overlapped with the sentiment labels, and wherein integrated information about a product or a feature overlapping reviews, images and user sentiments for a query search are presented and displayed in a form of notification cards and infographics, and wherein the reviews include a plurality of metatags to allow the user to click for obtaining further information, and wherein the plurality of metatags are multimedia messages, and wherein the analysis module is further configured to map integrated information related to the product or the feature by at least one of image recognition techniques, contextual data analyzing techniques, sentiment analysis, and vector analysis, and natural language processing, and wherein the analysis module is further configured to assign weights to words in the review by the analysis module through a software application or algorithm; and
 a registration module configured to acquire a review submitted by said user through a software application or algorithm, wherein said review concerns a product, an item or a feature and contains data in formats selected from a group consisting of text format, image format, multimedia format and combinations thereof, and wherein the registration module is configured to generate a collection of topics associated with the user, and wherein the collection of topics comprises at least one topic;
 a data mapping module configured to annotate an image using image recognition techniques through a software application or algorithm;
 wherein the image recognition techniques are applied on the images to retrieve a meaning of contents of the image, and then map to a knowledge graph, and wherein a sum of the knowledge graph and the image recognition techniques are used for structuring an unstructured data for consumption of the end user, and wherein the knowledge graph is created specific to the hotel amenities and wherein all hotel amenities are hierarchically arranged in the knowledge graph, and wherein the knowledge tree is configured to create generalized reviews of each of the relevant hotels to enable easy understanding of the hotels and the hotel services, and wherein sentences/review are generated from multimedia obtained from third-party databases, sentiment analysis, word vector analysis, and attribute analysis.

4. The system as claimed in claim 3, wherein the query receiver is further configured to receive a second set of search queries or nodes related to the expanded search queries from the user through a software application or algorithm.

\* \* \* \* \*